United States Patent [19]
Humphrey

[11] 3,880,502
[45] Apr. 29, 1975

[54] OPHTHALMOLOGICAL APPARATUS AND PROCESS HAVING INDEPENDENT ASTIGMATIC AND SPHERICAL INPUTS

[75] Inventor: William E. Humphrey, Oakland, Calif.

[73] Assignee: Humphrey Instruments, Incorporated, Berkeley, Calif.

[22] Filed: July 8, 1974

[21] Appl. No.: 486,279

Related U.S. Application Data

[63] Continuation-in-part of Ser. No. 263,329, June 15, 1972, Pat. No. 3,822,932.

[52] U.S. Cl. ............................... 351/39; 356/124
[51] Int. Cl. ............................................. A61b 3/00
[58] Field of Search ............... 351/39, 17; 356/124; 350/181

[56] References Cited
UNITED STATES PATENTS

| | | | |
|---|---|---|---|
| 3,015,988 | 1/1962 | Hemstreet | 350/181 |
| 3,428,398 | 2/1969 | Gottschalk | 350/181 X |
| 3,602,580 | 8/1971 | Samuels | 351/39 X |
| 3,841,760 | 10/1974 | Guyton | 351/39 X |

Primary Examiner—Paul A. Sacher
Attorney, Agent, or Firm—Townsend and Townsend

[57] ABSTRACT

An apparatus and process for measuring optometric spherical and cylindrical optic correction to the eye is disclosed. Typically, two pairs of counter-rotating positive and negative cylindrical lenses are actually used or optically emulated. As actually used, each positive cylindrical lens is counter-rotated relative to its paired negative cylindrical lens. These counter-rotating positive and negative cylindrical lenses produce variable positive and negative cylinder power relative to two axes substantially orthogonal to the optical axis of the lens instrument. Each pair of cylinders is aligned and counter-rotated relative to the remaining pair of cylinders to generate its positive cylinder and negative cylinder along the optical axes at a non-coincident angle (preferably precisely 45° removed) from the corresponding axes of the remaining counter-rotating lens pair. By choosing preselected positions of counter-relative rotation between the paired lens elements of each pair, virtually all optically practical angles and powers of cylindrical lens astigmatism correction can be generated independent of the spherical optical properties of any ocular lens train. Provision is made for the emulation of counter-rotating lens pairs by the insertion of the lens elements having variable astigmatic and spherical powers with the aforementioned optical properties. The process includes a Cartesian coordinate plot for describing astigmatic correction with reduced error, especially at low cylinder power and a process of determining correction required to existent and known prescriptions.

1 Claim, 12 Drawing Figures

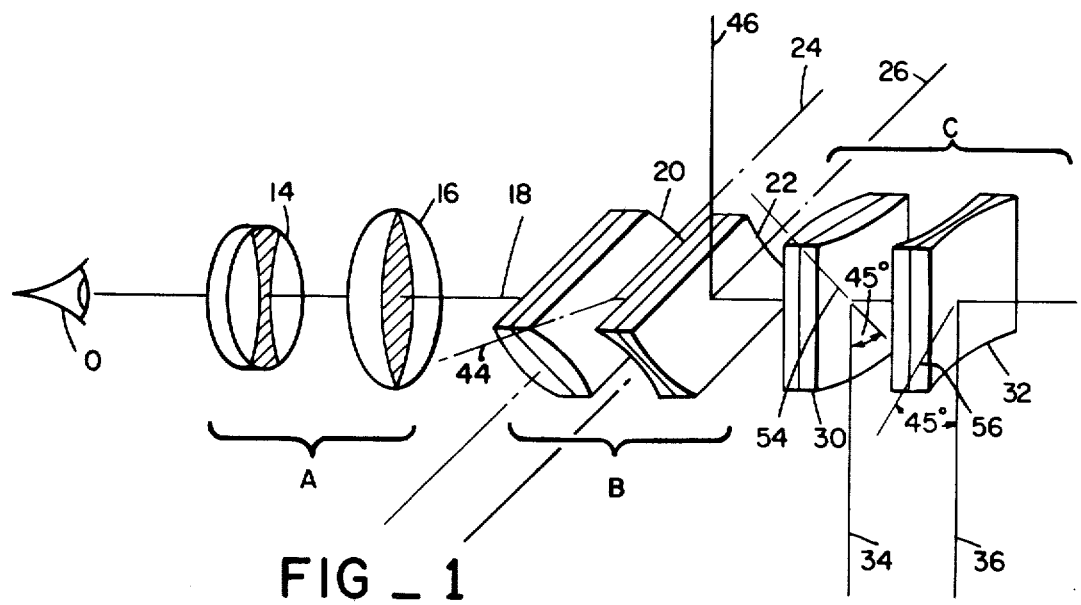
FIG_1
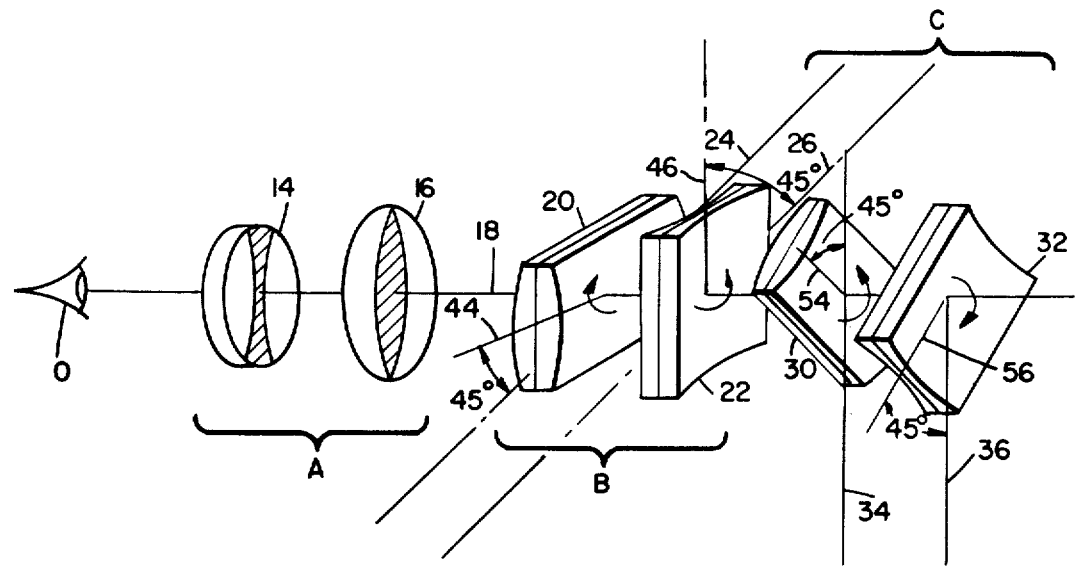
FIG_2

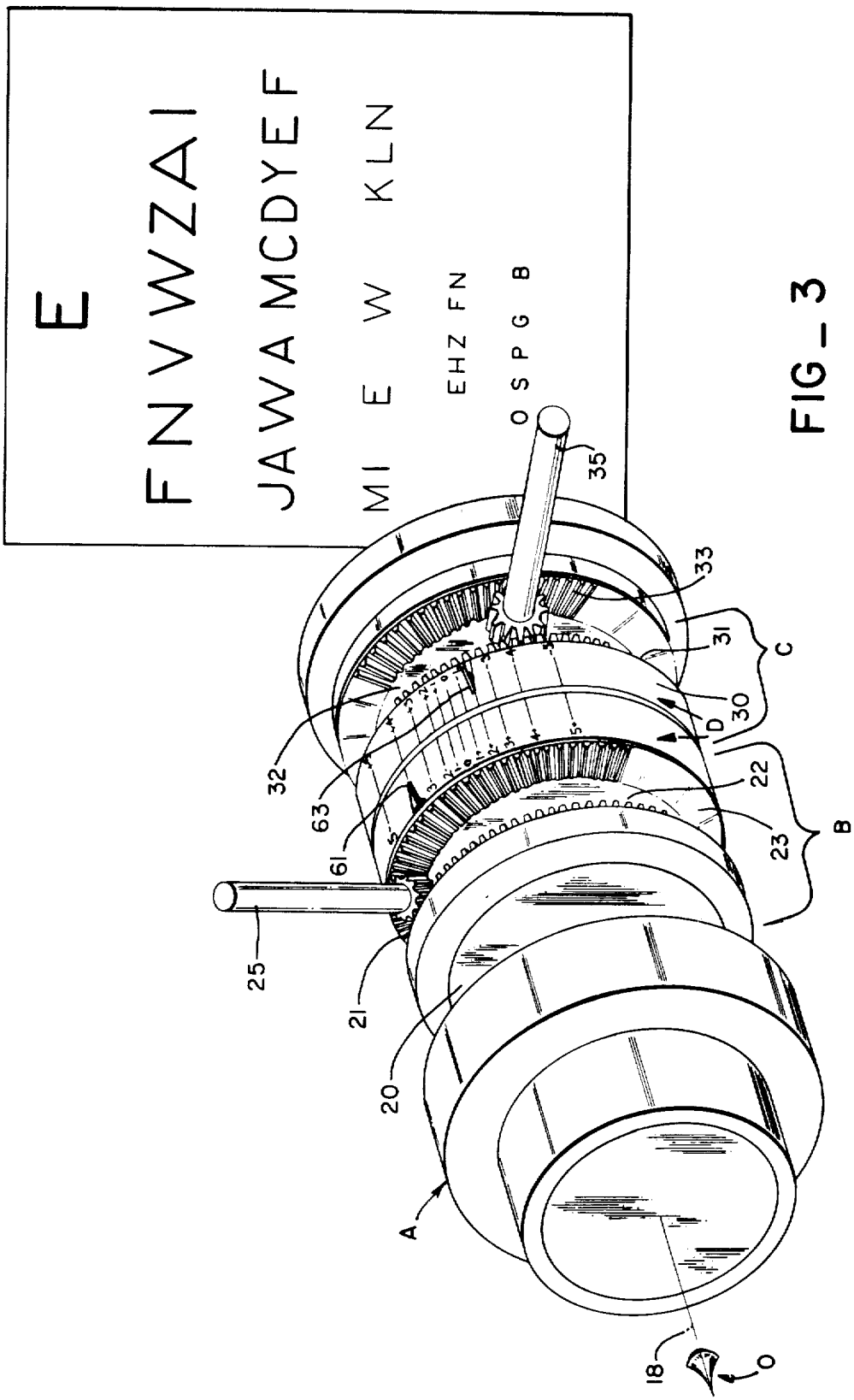

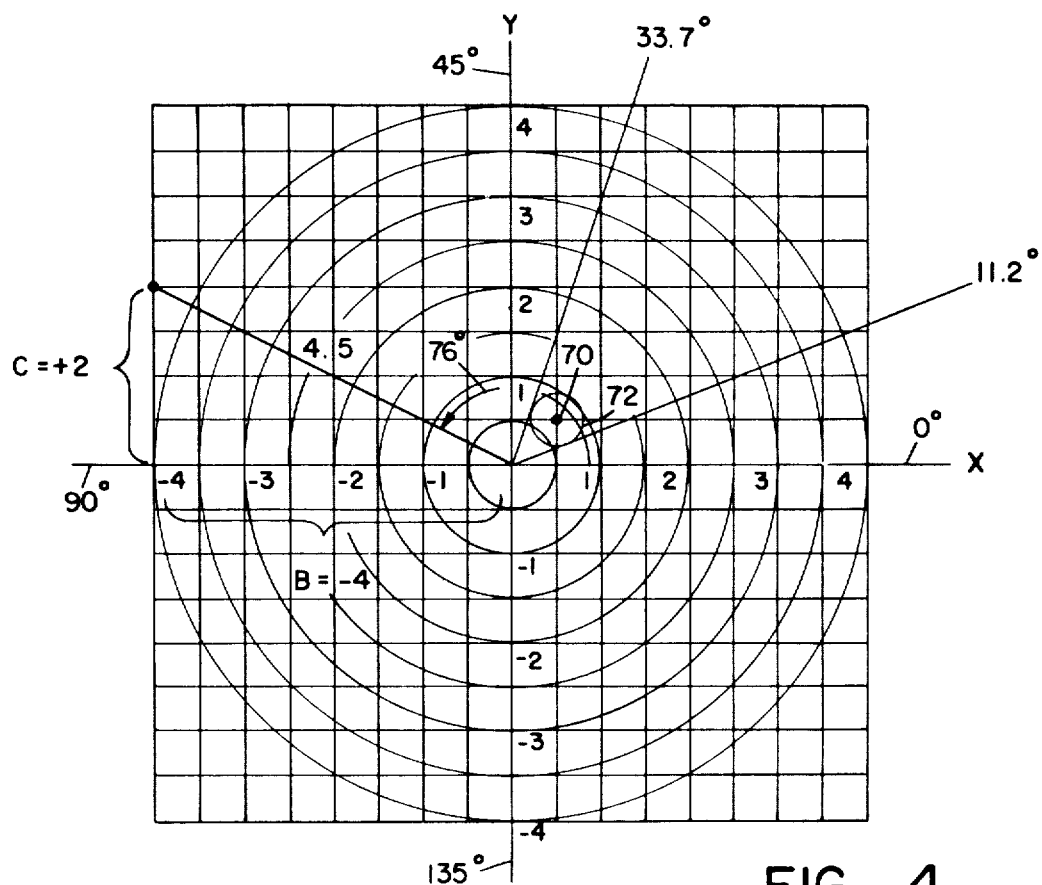
FIG_4
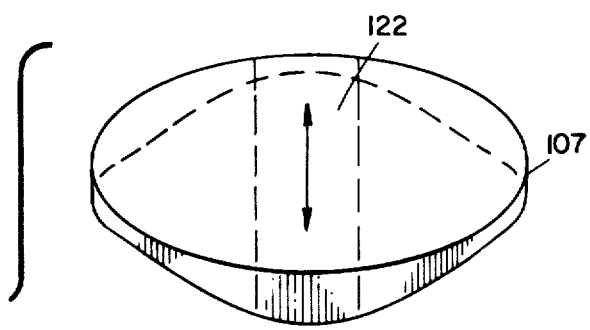
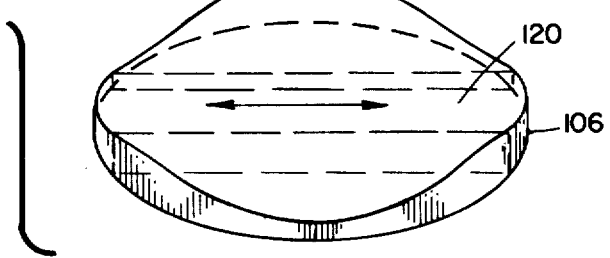
FIG_6

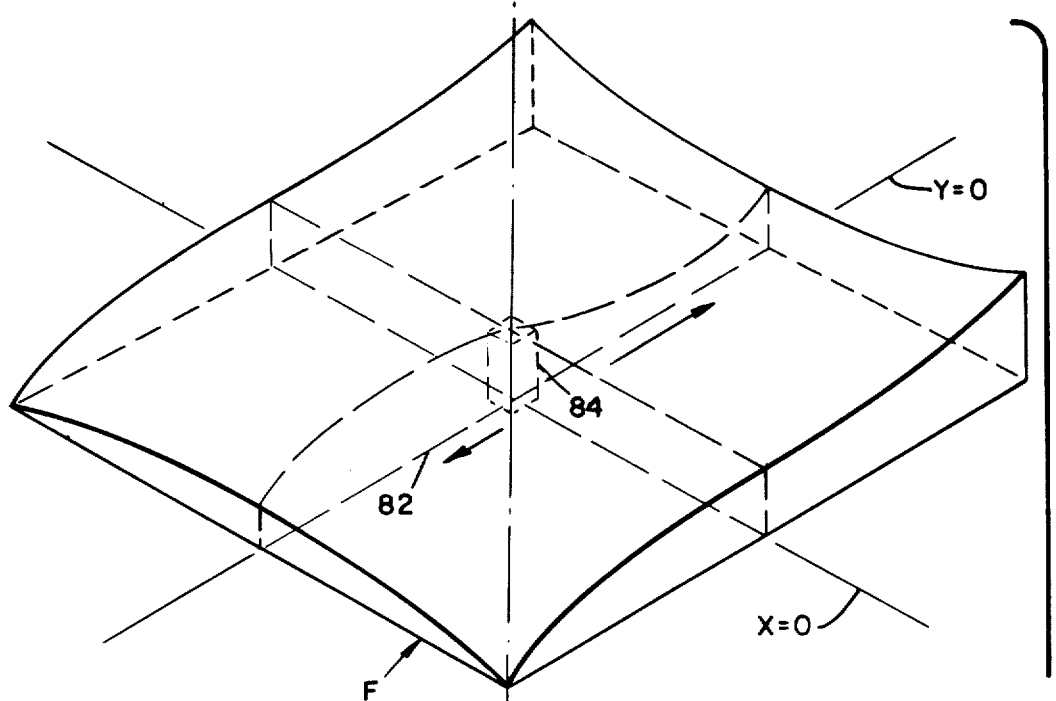
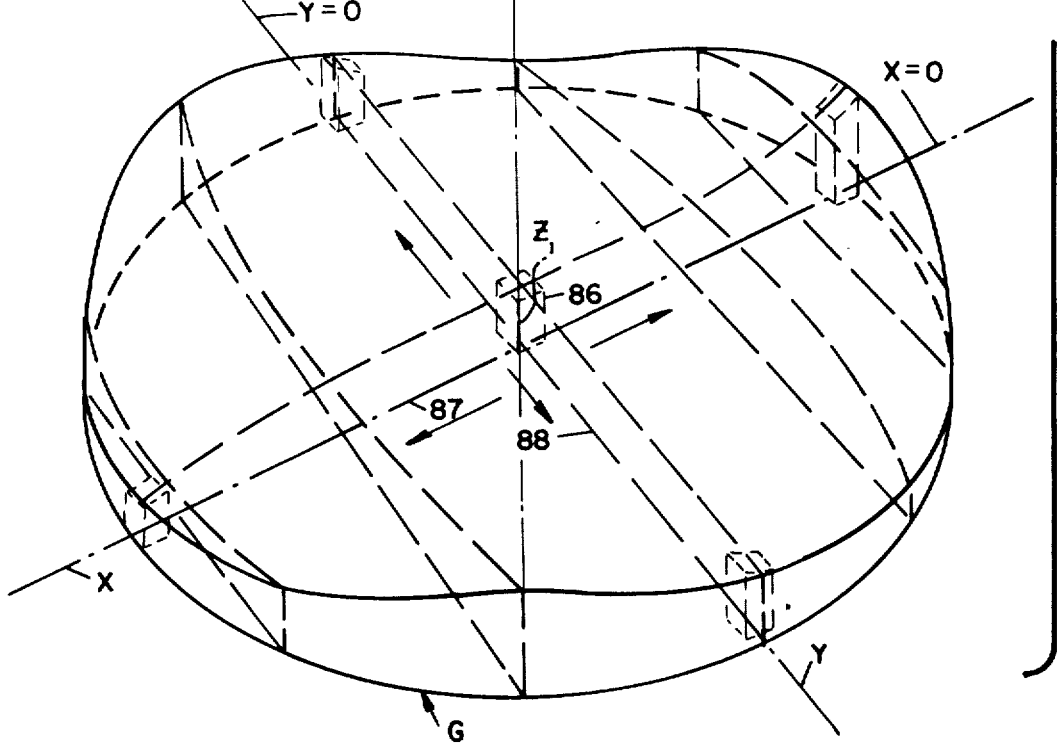
FIG_5

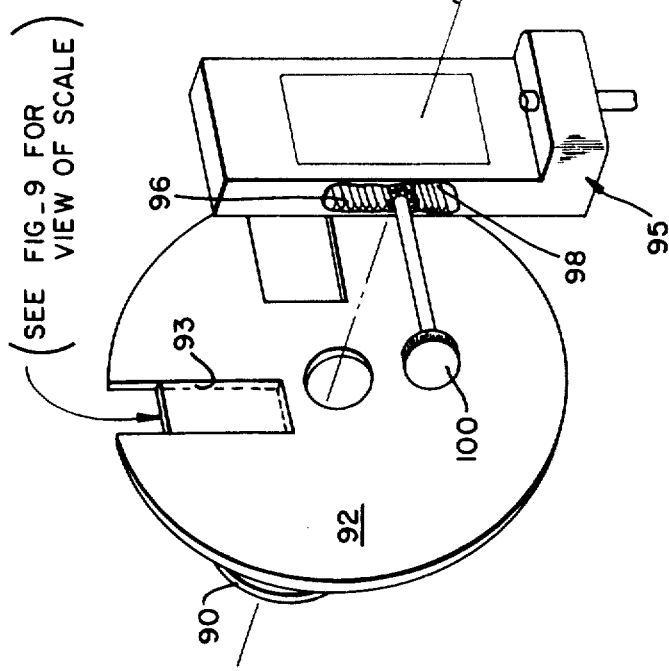
FIG_9
FIG_7
FIG_8

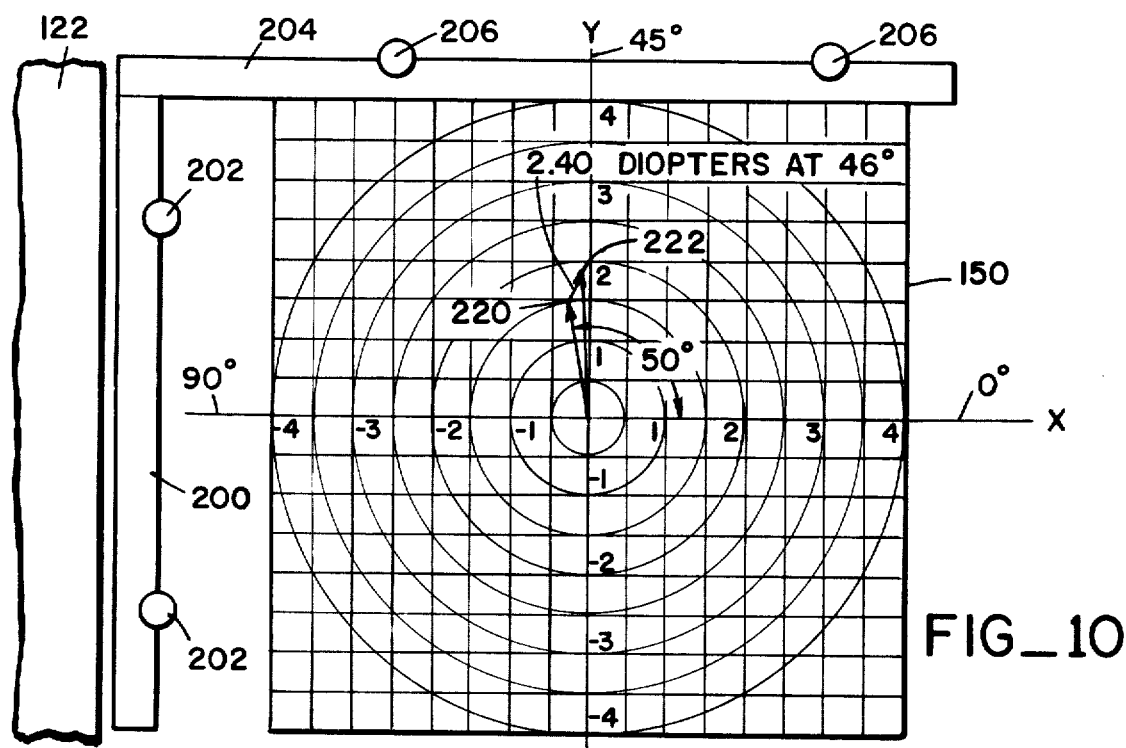
FIG_10
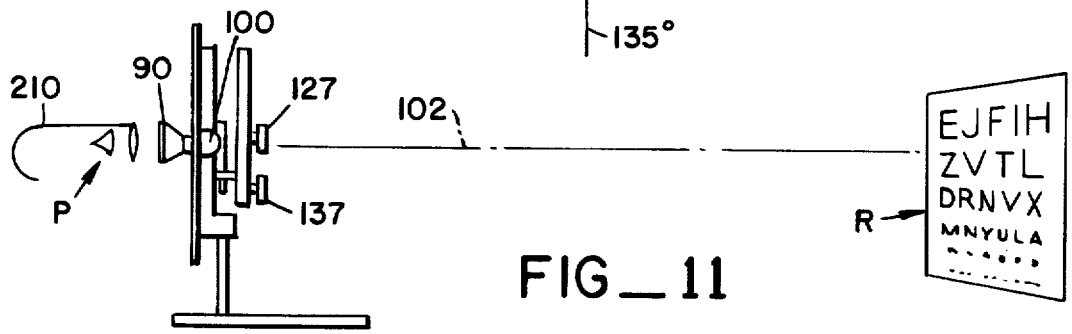
FIG_11
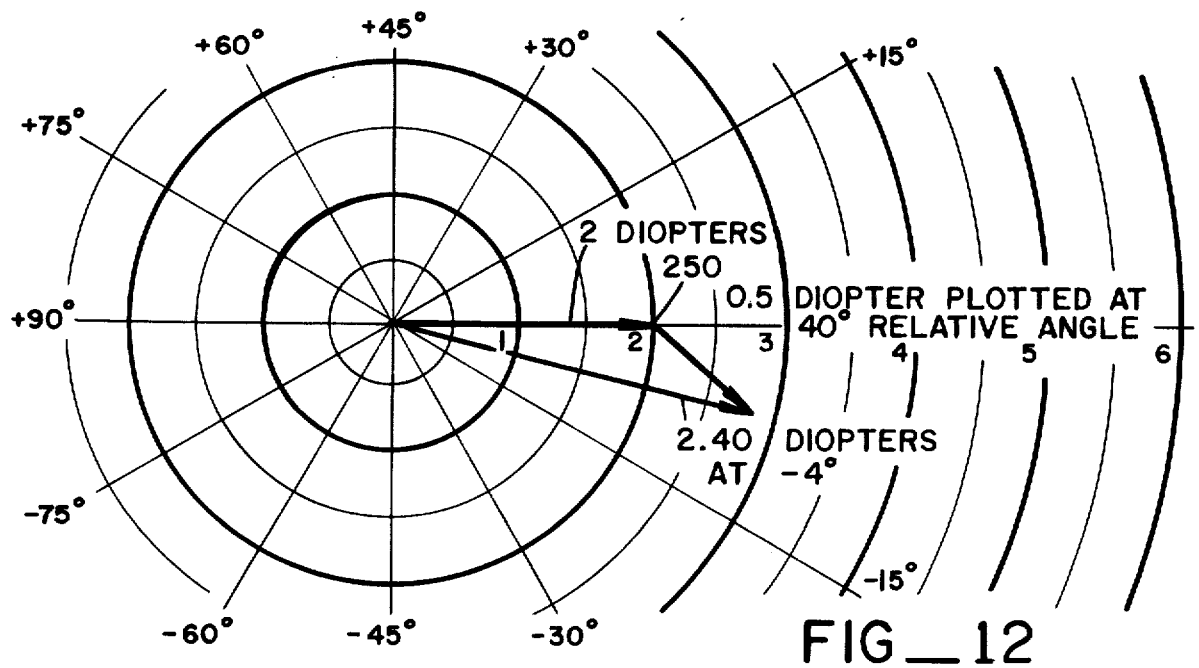
FIG_12

OPHTHALMOLOGICAL APPARATUS AND PROCESS HAVING INDEPENDENT ASTIGMATIC AND SPHERICAL INPUTS

This is a continuation-in-part of application Ser. No. 263,329, filed June 15, 1972, entitled OPTOMETRIC APPARATUS AND PROCESS HAVING INDEPENDENT ASTIGMATIC AND SPHERICAL INPUTS, U.S. Pat. No. 3,822,932 of July 9, 1974.

This invention relates to an optometric device for generating variable spherical and astigmatic optical input for measuring visual aberrations in the human eye.

Heretofore the optometric measurements of spherical optical and cylindric optical input in prescribing eye glasses have involved complicated instrumentation. Basically, optometric instruments have included a large number of cylinder optics of various powers. These optics are first inserted in an optical train and thereafter rotated to a selected alignment to emulate the desired prescription of eye glasses.

Several deficiencies result from such instrumentation. First, spherical optical input in such instruments is interrelated to the cylindric optical input. Assuming that the power of the cylinder input is changed, corresponding adjustment must be made to the spherical optical input. Considerable skill is required to operate such interrelated cylindrical and spherical inputs in an optometric instrument, preventing their use by the unskilled and requiring extensive training on the part of the skilled to learn the operation. Moreover hundreds of cylindrical lenses of various positive and negative power are usually incorporated in such optometric devices; manufacture and maintenance of optometric instruments having combined spherical and cylindrical inputs is very complicated. Finally, at low diopter cylindrical prescriptions rotational error of cylindrical alignment can become very large with the result that the probability of cylindrical angular misalignment is multiplied.

An object of this invention is to generate in an optometric instrument variable power astigmatic correction without interdependence with the spherical optical input. Typically, two pairs of counter-rotating positive and negative cylindrical lenses are used in combination with variable spherical optics. Each positive cylindrical lens is counter rotated relative to its paired negative cylindrical lens. These counter rotating positive and negative lenses produce variable cylinder power relative to two axes substantially orthogonal to the optical axis of the instrument. Each pair of cylinders is aligned and counter-rotated relative to the remaining pair of cylinders to generate positive cylinder and negative cylinder along the optical axis at a non-coincident angle (preferably 45° removed) from the corresponding axes of the remaining lens pair. By choosing pre-selected positions of relative counter rotation between the paired lens elements, virtually all optically practical angles and powers of cylindrical lens alignments and inputs can be generated independent of the spherical optical input.

An advantage of the disclosed astigmatic input is that it is variable without either dependence or relation to spherical input.

Another object is to position each of the paired positive and negative counter rotating cylinder lenses at precise 45° increments relative to the astigmatic variable axes of the remaining cylinder lens pair. An advantage of this 45° alignment is that each cylinder lens pair is variable without corresponding change to the astigmatic input of the remaining cylindrical lens pair.

Yet still another advantage of this precise 45° alignment is that each of the three optical inputs, the spherical input and two astigmatic inputs are each variable without interdependence to the remaining inputs; operation of the optometric devices is vastly simplified.

Still another advantage of the counter-rotating lens pairs is that their use in a binocular optometric device is possible; thus both spherical and variable cylindric binocular optics can be generated with as little as 12 lenses.

Still another advantage of this invention is its operation by completely unskilled personnel, even the patient. By merely being instructed to manipulate sequentially each of the inputs, patient manipulated vision measurement is possible. Thus the instrument is ideal for rapid screening of patients for evaluation leading to optometric referral.

A further object of this invention is to emulate two pairs of counter rotating positive and negative cylinder lenses producing variable cylinder power at axes orthogonal to the view path for each pair and of counter-rotating positive and negative cylindrical lenses with non-coincidence at 45° angles along the view path of the instrument. According to this aspect of the invention at least one variable astigmatic lens is inserted in the optical train in combination with variable spherical optics, either of the variable spherical lens variety or alternately of the conventional concentric variety. By choosing pre-selected positions of displacement between the optic path and the variable astigmatic lens, virtually all optically practical angles and power of cylindrical lens inputs can be generated independent of spherical optical inputs.

An advantage of using a variable astigmatic lens is that read-outs either in polar coordinates or Cartesian coordinates indicating astigmatic correction can be easily obtained.

Yet another advantage of using a variable astigmatic lens is that the displacement of the lens elements relative to the optic path is directly proportional to the astigmatic correction required. Adjustment for the sine of cylinder counter-rotation angle is not required.

Still another object of this invention is to set forth a new method for describing astigmatic correction particularly useful at low power astigmatic correction. Typically, standard astigmatic correction in polar coordinates are replaced with a Cartesian coordinate plot. This Cartesian coordinate plot is generated by describing the axis of cylindrical lens rotation on a plot so that 180° of cylindrical lens rotation is described over 360° of polar coordinate plot. By the superimposition of Cartesian coordinates on this rotationally expanded polar coordinate plot, error at low cylinder powers can be reduced. Reproducibility of optical settings becomes more precise over a large range of correction powers.

Yet another object of this invention is to disclose a process of applying correction to an existent prescription of a patient. According to this aspect of the invention, a patient is tested with his eye glasses on. A specialized polar coordinate chart descriptive of the patient's astigmatic prescription is moved to indicate the cylindrical prescription of the patient at the neutral or zero cylinder setting of the machine. Thereafter, the patient is examined with his glasses on to determine a corrected prescription. By the expedient of a simple polar coordinate vector addition, the new prescription in cylinder and angle can be readily determined.

An advantage of this process of testing a patient with his eye glasses on is that in prescriptions where large correction is required, the patient can focus through his existent prescription. The confusion generated by returning to substantially unprescribed disposition is avoided.

A further advantage of this aspect is that a reliable check of prescription determined by conventional eye screening is generated, this check occurring through the patient's existent eye glasses.

Other objects, features and advantages of this invention will become more apparent after referring to the following specification and attached drawings in which:

FIG. 1 is a schematic perspective view of a conventional Galilean Telescope in combination with two pairs of counter-rotating negative and positive cylindrical lenses, the lenses here being shown in their neutral position with their respective neutral axis displaced 45° one to another;

FIG. 2 is a view similar to FIG. 1 with the lens pairs here being illustrated in maximum counter-rotation in one direction only so that a maximum of astigmatic correction is generated with the counter-rotating cylinders;

FIG. 3 is a partially broken-away perspective view of an optometric instrument illustrating apparatus for counter-rotating cylindrical lens pairs;

FIG. 4 is a graphic plot illustrating the output of the instrument plotted in polar coordinates and Cartesian coordinates with the resultant uniformity of instrument error through the use of Cartesian coordinates herein graphically illustrated;

FIG. 5 is an exploded schematic view of a two element optometric instrument according to this invention;

FIG. 6 is a perspective view of two overlying variable astigmatic lens elements;

FIG. 7 is an exploded perspective device according to this invention utilizing the variable astigmatic lens elements of FIG. 6 with variable spherical optics in an optometric device;

FIG. 8 is a side elevation of a patient using an optometric device with an attached eye chart;

FIG. 9 is a scale used for reading spherical power correction hidden from the views of FIGS. 7 and 8;

FIG. 10 is a graphic plot especially adapted for attachment to the optometric device according to FIG. 7 for use in providing a vision correcting measurement to a patient having an existent cylinder prescription;

FIG. 11 is a side elevation of a patient using the optometric device with an attached eye chart, the patient here shown wearing an existent prescription containing cylinder; and, FIG. 12 is a specialized chart used for the graphic plotting of the result realized by the apparatus of FIGS. 10 and 11.

Referring to FIG. 1, one embodiment of the invention is illustrated. Specifically, a Galilean Telescope A is shown in combination with a first pair of counter-rotating negative and positive cylindrical lenses B and a second pair of counter-rotating negative and positive cylindrical lenses C. Galilean Telescope A is conventional; it includes a negative spherical lens of the concave variety 14 and a positive spherical lens of the convex variety 16. As is apparent to those skilled in the art, by varying the spatial separation along the optical axis 18 between the lens elements 14 and 16, a variable spherical optical input correction can be obtained.

The counter-rotating cylindrical lens pair B disposed along optical axis 18 includes a positive cylindrical lens 20 and a negative cylindrical lens 22. As aligned in FIG. 1, several observations can be made about the positive and negative cylindrical lenses 20 and 22.

First, these lenses are preferably of equal and opposite power; that is to say the positive cylindrical effect of lens 20 is equal and opposite to the negative cylindrical lens effect of lens 22. Thus, when the lenses are aligned with their cylindrical lens axes 24 and 26 coincident, the combined cylindrical power will be zero in that the positive cylindrical effects of lens 20 will be precisely cancelled by the negative cylindrical effect of lens 22.

Moreover, when the lenses are counter-rotated two effects will occur. First, the combined cylindrical effect of the two lenses along axes 44 and 46 at 45° to the axes 24, 26 will change. Secondly, the combined cylindrical effect at axes 24, 26 and at 90° intervals from axes 24, 26 will be zero. Finally, the overall spherical input of Galilean Telescope A will remain unchanged even as to all positions of counter-rotation between the lens pairs. This will be seen from the fact that for every positive cylinder inserted into the lens train an opposite negative cylinder will be placed into the lens train by the combined action of cylindrical lenses 20 and 22. The spherical input contribution of the cylindrical lenses 20, 22 will thus cancel one another. It is important to note that these effects are true for all positions of counter relative rotation between the respective lens elements 20 and 22.

Counter-rotating cylindrical lens pair C comprising positive cylindrical lens 30 and negative cylindrical lens 32 is shown disposed along optical axis 18. These two lenses 30 and 32 of equal and opposite positive and negative cylindrical power respectively are shown with their respective cylindrical axes 34 and 36 aligned vertically with respect to the axes of FIG. 1. This vertical alignment of the axes 34 and 36 of cylindrical lenses of equal and opposite power produces a combined neutral lens input. Just as in the case of the positive and negative counter-rotating cylindrical lenses B, the counter-rotating positive and negative cylindrical lenses C are shown aligned in FIG. 1 so that they have no overall cylindrical effect on the optical axis 18.

When counter relative rotation occurs between the lens elements 30 and 32 in equal and opposite amounts, two effects occur. First, cylinder of variable power is generated at axes 54 and 56 disposed 45° relative to axes 34 and 36. No cylinder is effectively generated along axes parallel to axes 34, 36 or at 90° increments from axes 34, 36. Finally, the overall spherical effect on the lens train remains unchanged. Thus, even though there is a change in counter relative rotation of lenses 30 and 32, there is no change of variable spherical input required at Galilean Telescope A.

It is important to note that the cylindrical lens axis 24 of lens 20 and cylinder lens axis 26 of lens 22 are angularly displaced with the respective cylindrical lens axes 34 of lens 30 and the cylinder lens axis 36 of lens 32. This displacement is here illustrated at an angle of precisely 45°. It has been found by making the neutral positions of the paired and counter-rotating cylindrical lenses of opposite power displaced at an angle of precisely 45° that virtually all cylinders of pre-selected power and pre-selected angular rotation can be conveniently generated.

Referring to FIG. 2, the counter relative rotation of the lens pairs is illustrated. As shown in FIG. 2, the counter relative rotation is illustrated in an extreme case; each cylindrical lens has been rotated in one direction to 45°. While such rotation on a practical optometric basis is not particularly optically useful nor commonly occurring, it is used here to illustrate the relative rotation of the cylindrical lens elements to enhance understanding of this invention.

Referring to FIG. 2, it will be seen that lens element 20 has been rotated counterclockwise 45° with respect to the eye of an observer O. Thus, the cylindrical axis of the cylindrical lens element 20 has rotated from its former position 24 to a new position 44 through an angle of 45°.

The cylindrical rotation of lens element 22 has been equal and opposite. This rotation has been 45° clockwise with respect to the eye of an observer O. Thus, the axis of the cylindrical lens element 22 has rotated from the old angular position 26 to the new angular position 46.

It will be observed that the positive cylindrical lens 20 and the negative cylindrical lens 22 are each reoriented with their respective axes 44 and 46 at 90° one from another. In this alignment the lens pair will generate a maximum and positive cylinder parallel to axis 44 and a corresponding negative cylinder parallel to axis 46.

The counter relative rotation of negative and positive cylindrical lens pair C is analogous. Lens element 30 has rotated clockwise with respect to the eye of observer O an angle of 45°. Thus, the new cylindrical axis of the positive cylindrical lens 54 is 45° displaced from the old cylindrical lens axis 34.

Similarly, lens element 32 has rotated 45° counterclockwise with respect to the eye of observer O. A new axis 56 is shown displaced 45° relative to the old axis 36. A maximum positive cylinder is generated by the lens pair parallel to axis 54. A maximum negative cylinder has been generated parallel to axis 56.

Analyzing the relative counter-rotation of the positive and negative cylindrical lenses it will be seen that each of the counter-rotating lenses can be moved so as to generate along axes displaced 90° one from another variable positive and negative cylinder. In the case of positive cylindrical lens 20 and negative cylindrical lens 22, counter relative rotation opposite to that illustrated in FIG. 2 will generate a maximum negative cylinder along the axis 44 and a maximum positive cylinder along axis 46. Similarly, rotation opposite to that illustrated with respect to paired lens element C will generate a maximum negative cylinder along axis 54 and a maximum positive cylinder along axis 56.

Having seen one possible rotation of the counter rotating lens elements B and C in FIG. 2, the general rotation of the lens element can be at least partially understood. Broadly, lens elements B are aligned to provide either positive or negative respective cylinder correction along the orthogonal axis 44 and 46 with respect to the path 18. Similarly, counter rotating lens element C are aligned to provide either positive or negative cylinder along the axis 54 and 56 orthogonal to the optic path 18.

If an imaginary plane is taken along and through the optic path 18 and it includes the axes 44, it will be seen that this plane does not include either the axes 54 or the axes 56. Rather, the axis 54 and the axis 56 are here shown separated by a precise interval of 45° from such an imaginary plane including axes 44 and the path 18.

The same can be said for the angular separation of axes 44, 46 on one hand and axis 54, 56 on the other hand. An imaginary plane including the optical path and axes 46 when projected along the optical path will be precisely separated by 45° angles from the axis 54 and 56.

It is required in the practice of this invention that there be some separation between the respective planes defined by the axis 44, 46 along the optic path and the corresponding axis 54, 56. This separation does not have to be 45°. It can be some other angular separation.

It should be understood that the precise 45° separation here shown does have an advantage. Basically, in a precise 45° separation, the astigmatic input of one pair of counter-rotating cylinders B is separate and independent of the astigmatic input of the remaining pair of counter-rotating cylinders C.

It will be remembered that cylindrical lenses are ambiguous in their rotational alignment at every 180° of rotation. Further, as to counter-rotation equal and opposite positive and negative cylindrical lens pairs, it will be seen that counter-relative rotation of each of the lenses relative to the other of the lenses beyond 90° generates a solution previously found in the first 90° of relative counter-rotation. Thus, no practical purpose is served by providing more than 90° of relative counter-rotation on either side of the neutral axes position of the counter-rotating lens elements.

I have found that by aligning the neutral position of the paired counter-rotating cylindrical lenses of equal and opposite power at increments different than 90° and preferably at increments of 45°, virtually all optically useful angles and powers of cylindrical lens alignment and cylindrical lens optical power can be generated. It should be noted that in generating these powers of optical alignment, each of the lens pairs B and C are moved preselected amounts relative to one another to make the desired optometric prescription. The amounts of counter relative rotation between the paired elements B are not necessarily and in fact usually are not the same as the amounts of counter relative rotation between the paired lens elements C. Rather the amounts of relative rotation are chosen on an individual prescriptive basis by either the patient or the technician, ophthalmologist, or doctor utilizing the instrument.

Having set forth the theoretical considerations relating to the operation of this invention, improved understanding of this disclosure can be had with reference to the prior art. Specifically, attention is directed to the R. E. Gottschalk U.S. Pat. No. 3,428,398 dated Feb. 18, 1969. This patent relates to an anamorphic lens system. Basically, a fixed focus spherical lens in a carrier has two identical pairs of counter rotating cylinder lenses mounted on the carrier aligned to and on either side of the spherical lenses. These two cylinder lenses, of equal and opposite power, are rotated in equal and opposite directions.

It is important to note the distinctions of the present invention from the disclosure of Gottschalk. Most importantly, in Gottschalk the horizontal and vertical variations of the cylinder lenses each occur along coincident horizontal and vertical axis. Stated in other words, taking a plane along the optical path of the lens system and through either the horizontal and vertical cylinder variations of one counter rotating lens pair, this plane will be coincident with the axis of the horizontal or vertical cylinder variation of the remaining lens pair.

Finally, and in actual concept, it must be remembered that my disclosure is directed to emulating crossed cylinder optical effects at any orientation. As contra distinguished from my disclosure, Gottschalk's counter relative rotation is designed only to fit to the horizontal or to fit to the vertical or both as required by the varying dimensions of horizontal and vertical projected pictures.

To further explain this invention, reference will be made to FIG. 3, a perspective view partially broken away illustrating an actual optometric device utilizing this invention. Thereafter, reference will be made to FIG. 4 to illustrate how the relative counter-rotation of the lens elements convert to a single cylindrical prescription of power and rotational alignment.

Before passing to FIG. 3, several observations should be made about FIGS. 1 and 2. First, the cylindrical lenses in FIGS. 1 and 2 have been illustrated of rectangular configuration. This rectangular configuration, although not particularly optically useful, greatly facilitates the understanding of the rotational effect of the lens elements of this invention. Secondly, the mechanism for effecting the counter relative rotation of the lens elements has been omitted to facilitate understanding of the optic configuration and alignment. Finally, the configurations of the cylindrical lenses have been grossly exaggerated with the hope that this exaggeration facilitates in understanding of lens configuration and this invention.

Referring to FIG. 3, an optometric instrument incorporating Galilean telescope A, the first pair of counter-rotating positive and negative cylindrical lenses B and the second pair of counter-rotating positive and negative cylindrical lenses C is illustrated. Positive cylindrical lens 20, here shown in conventional circular dimension, is mounted interior of a circular rack gear 21. Similarly, negative cylindrical lens 22 is shown mounted interior of a circular rack gear 23. By the expedient of mounting a pinion 25 between gears 21, 23, counter relative rotation of positive cylindrical lens 20 relative to negative cylindrical lens 22 can be produced. By the expedient of having an identical gear ratio between pinion 25 and gear 21 on one hand and pinion 25 and gear 23 on the other hand, it will be seen that the relative rotation of lens elements 20 relative to lens element 22 will be equal and opposite upon rotation of the gear 25.

The relative counter-rotation of lens elements 30, 32 is precisely analogous. Typically, lens elements 30 is mounted interior of a circular rack 33. A pinion 35 confronted to both racks 31 and 33 effects counter relative rotation between the racks as they are of identical gear ratio.

The mechanics of varying the spherical power of the standard Galilean telescope A are not shown. Such mechanics are conventional and need not be repeated here. It will suffice to say that the Galilean telescope illustrated is not new in itself although it finds a novel and useful insertion in the combination of the optometric instrument here shown.

In use, the patient is positioned with the eye of the observer O located on the optic axis 18. First, the spherical optics A are adjusted to provide for optimum spherical correction to the eye. Typically, this can be simply done by the patient adjusting the spherical optics of the Galilean telescope A in a conventional manner. Thereafter, pinion 25 is rotated until vision becomes optimum. Finally, pinion 35 is rotated until vision becomes optimum.

After one adjustment of the telescope A and pinion 25 and pinion 35, a sequential readjustment can occur. This readjustment is not made necessary by an interdependence between the spherical and cylindrical optics. Rather, when the astigmatic correction to the eye of observer O is made, the improved resultant vision astigmatically will render the eye of observer O capable of detecting smaller improvements in the spherical vision. Similarly, smaller improvements in the spherical vision will make the eye astigmatically more sensitive to higher levels of astigmatic correction. All in all, it has been found that two sequential adjustments of the telescope and thereafter the astigmatic corrections is all that is usually needed to bring the instrument to a final optical setting.

When an optical setting occurs it is necessary to read the relative counter-rotation of the lens elements. This can be done by attaching a cursor 61 to circular rack 23 and a cursor 63 to circular rack 31, pointed to read at an intermediate scale D.

Directing attention to scale D as illustrated on the casing of the instrument shown in FIG. 3, a lens system having a total power of 5 cylindric diopters is shown. Observation will indicate that cursor 61 from paired counter-rotating lens elements B and cursor 63 from paired counter-rotating lens elements C read on the same scale. Typically, the scale is laid out in diopter powers labeled as 1 through 5 positive and negative for each cursor and corrected for the naturally occurring sine distortion.

With reference to FIG. 3, cursor 61 attached to circular rack 23 is shown rotated to the minus 4 diopter position on scale D. Similarly, cursor 63 is shown rotated to the plus 2 diopter position of relative rotation on scale D from its attached position on circular rack 31.

Having set forth a reading on the scale D it now remains to plot the readings in accordance with this invention on the Cartesian coordinate astigmatic plot of FIG. 4. Thereafter demonstration of the translation of the Cartesian coordinate plot into a convention polar coordinate plot for setting forth astigmatic correction to the eye will be made.

Referring to FIG. 4, it will be remembered that cursor 61 pointed with a minus 4 diopter position. Cursor 61 indicates the relative counter rotation of lens elements B to a minus diopter setting. This minus diopter setting indicates a negative cylindrical correction in the vertical direction in the plot of FIG. 4. This corresponds to a minus 4 diopter in the negative X-axis direction of the plot of FIG. 4.

Similarly, cursor 63 attached to relatively rotating lens element C has been moved to a positive 2 diopter setting. Since the astigmatic input of lens elements C is along the 45°–135° axis, this is the equivalent of a positive 2 setting in the Y-axis of the Cartesian coordinate plot of FIG. 4, it being remembered that the angle of the cylinder plot has been expanded by a factor of 2.

The Cartesian coordinate plot converts to conventional cylindrical lens angle. However, the cylindrical lens angle has been doubled or multiplied by a factor of 2. Thus, in the plot illustrated in FIG. 4, 180° of cylindrical lens rotation appears over 360° of actual polar coordinate plot.

Referring to FIG. 4, it can be seen that the minus 4 diopter setting of the B counter rotating cylindrical lens elements and the plus 2 diopter setting of the C elements has resulted in a 4.5 diopter cylindrical lens adjustment to the prescription at an angle of approximately 76°.

This particular lens setting is an extreme lens setting. Very few optical corrections are required that are that strong. This particular illustration is given here so that the polar coordinate plot of this invention may be set forth and thereafter understood.

It will be realized to those skilled in the art that the particular form of Cartesian coordinates used here has an additional advantage. Specifically, at low diopter power, conventional polar coordinate system prescription of astigmatic lenses becomes unwieldly. This inconvenience is due to the margin of error and the fact that the error increases with respect to angular rotation as lower diopter cylindrical lens corrections are required.

An example of this error plotted into these coordinates can be helpful.

Assume that the counter-rotating lenses B and C have their respect cursors 61 and 63 each moved to the positive one-half of a diopter correction. Assume further that the uncertainty of the measurement could be plus or minus one-half diopter.

Referring to FIG. 4, it can be seen that the one-half a diopter counter-rotated position for lens elements B and C has been plotted at 70. Moreover, the area of possible error in the one-half a diopter has been plotted at 72. Assuming that the visual error of the patient in the astigmatic correction could fall anywhere within the circle 72 it can be seen that the polar coordinate plot produces large error in angular description. For example, assuming that the point of the instrument was to fall somewhere within the circle 72, the angle of that circle could range anywhere between 11.2° and 33.7°.

It will be further remembered that in actual physical practice if a cylindrical lens element is rotated to produce a one-half diopter setting, the mechanics of determining when the eye's vision is actually improved becomes very hard. In practice, it has been found that relatively large increments of rotation over large numbers of degrees are required to bracket the desired visual correction in astigmatic input.

Having proceeded this far, it will be seen that the invention herein described has a synergism not immediately apparent. First, and as has been emphasized the astigmatic input of counter-rotating positive and negative cylindrical lenses B and C are each independent of the spherical optics used in the combination. Secondly, and just as importantly, a new prescription system, graphically illustrated in FIG. 4 has been developed. By collating the independent optical inputs of counter-rotating cylinders B and counter-rotating cylinders C on axes 90° apart, the polar coordinate convention heretofore used is converted to a Cartesian coordinate system. This Cartesian coordinate system not only has the capability of being readily translatable into the older and more conventional cylinder optical description of angle of rotation and diopter power, but additionally can be used as a method in itself to describe astigmatic optical correction. Moreover, and as demonstrated in the plot of 70 and the error of circle 72, at low diopter power of optical correction, the rotation of the low power cylindrical lens has a potential uncertainty in the gross amount indicated by the plots at 11.2° and 33.7° on FIG. 4 while the Cartesian coordinates have a uniform uncertainty for all values of correction.

It has been pointed out with respect to FIGS. 1 through 3, the counter-rotating pairs of cylindrical lenses are only one way in which the invention can be practiced. Alternately, the invention can be practiced with variable spherical optics and variable astigmatic optics. Specifically, and with reference to FIG. 5, practice of this invention is illustrated with two lenses, one a variable spherical lens and the other a variable astigmatic lens. Similarly and with respect to FIGS. 6 through 8, practice of this invention is illustrated with respect to paired variable spherical lenses and paired variable astigmatic lenses.

Referring to FIG. 5 an optical axis 80 is illustrated intercepting a variable spherical lens element F and a variable astigmatic lens element G.

The particular variable spherical optical lens element here set forth is described in the L. W. Alvarez U.S. Pat. No. 3,305,294 and further in the L. W. Alvarez and William E. Humphrey U.S. Pat. No. 3,507,565 issued Dec. 3, 1964 and Feb. 21, 1967 respectively. In the interest of brevity the length descriptions there set forth will not be repeated here. It will suffice to say that by moving the variable spherical lens element F along the axis 82, the spherical power changes from a variable positive power in the lower left-hand corner of the lens element to a variable negative power in the upper right-hand portion of the lens element. It will be understood that a view path 84, is here shown through a neutral segment located in the center of the lens along the axis Y = 0. As the distance between the preselected viewpoint selected through the lens element increases in distance from the neutral segment, either in the positive or negative direction, the power of the variable power spherical lens element correspondingly increases, either in positive or negative power correspondingly.

As is set forth with more particularity in U.S. Pat. No. 3,507,565, issued Feb. 21, 1967, two important observations can be made about the use of this lens. First, the viewpath should be confined to a small discrete lens segment through the lens. Otherwise, the variation will occur within the segment of the lens used with resultant distortions.

Secondly, a viewpath should only be taken along the axis 82 or along the axis Y = 0. Otherwise undesirable astigmatic input into the spherical optics of this invention will occur.

Lens element G is more fully described in my co-pending patent application, Variable Anamorphic Lens and Method for Constructing Lens, Ser. No. 235,134, filed Mar. 16, 1972, now U.S. Pat. 3,751,138, issued Aug. 7, 1973.

An anamorphic lens G generates variable cylinder lens power and variable cylinder lens rotation over incremental viewpoints chosen through its surface. Cylinder power and rotation is a function of the displacement distance and angle of a viewpoint segment on the lens from a neutral viewpoint segment on the lens.

The lens element G can be defined in terms of a thickness equation. A transparent lens media is chosen having two substantially parallel optic interfaces on either side with the transparent optical media of the lens therebetween. There is chosen an arbitrary "optical" axis which extends through the optic interfaces and through the transparent optical media substantially normal to the plane of the optical interfaces. Employing an orthogonal system of X, Y, and Z-axes, the optical axis of the lens is taken to be the Z-axis and the effective optical thickness variation $t$ is measured parallel to this axis. The optical thickness of the lens element varies over its surface. This thickness variation includes an effective optical thickness variation ($t$) defined by the lens equation in $x$ and $y$ Cartesian coordinates within which the characterizing terms are:

$$t = A ( (x^3/3) - xy^2)$$

WHERE:
- $x$ is distance along the X-axis;
- $y$ is distance along the Y-axis;
- $A$ is a constant representative of the rate of lens power variation over the lens surface; and,
- $t$ represents optical thickness as the effective lens thickness parallel to the optic axis, taking into account both the geometrical thickness of the lens element taken in the mean direction of light rays passing through the lens and the refractive index of the material of the lens element when formed.

Regarding optical thickness, if the lens material is of uniform refractive index, $t$ (optical thickness) may be taken as the product of geometrical thickness times refractive index. Hence if there are variations in the refractive index, there will be compensating variations in the geometrical thickness.

It should be understood that the lens thickness here defined is a thickness variation which varies from place to place throughout the lens. This variation is dependent upon the $x$, $y$ displacement of a point on the lens from an origin of reference.

It should be understood that the lens here disclosed can be generated with respect to virtually any known surface. This surface does not have to form one face of a lens. Moreover, the surface can be an imaginary surface either interior of the material of the lens, exterior of the material of the lens, or partially interior and partially exterior of the material of the lens. Of course, it is required that a thickness variation be present in the optical element which follows the proper dimension relationship of the equation set forth.

In addition to the terms set forth, the thickness equation of the lens may have other optical terms, provided that such optical terms shall not contain any power of $x$ or of $y$ higher than the second power or any power of $xy$ other than the first power which has a coefficient producing thickness variations of considerable magnitude relative to these produced by the constant A. Thus, the complete lens equation may be written:

$$t = A ( (x^3/3) - xy^2) + Bx^2 + Cxy + Dy^2 + Ex + Fy + G$$

in which:
B, C, D, E, F, and G are constants that may be given any practical value, including zero.

In the circumstances (such as FIGS. 6, 7 and 8) wherein the two such variable lens elements are employed together, the values of B, C, D, E, F, and G may not be the same in the thickness equation for the two elements. The magnitude of A should be the same in both equations, but an element of the same sign can be turned around and used.

It is also possible to express the equation of this invention in polar coordinates. Such an expression has the value:

$$t = A((r^3/3) \cos 3\theta)$$

WHERE:
- $t$ is optical thickness as described hereinabove;
- $A$ is a constant representative of the rate of lens power variation over the lens surface as described hereinabove;
- $r$ and $\theta$ are polar coordinates of a particular element of area.

By selecting a pre-selected view segment through the variable astigmatic lens G, counter-rotating cylinders can be emulated. Specifically, by displacing the lens along axis 87 astigmation can be changed in the vertical and horizontal directions as indicated by the axis described in FIG. 7. Such displacement is precisely analogous to counter-rotation of the lens elements B of FIGS. 1 and 2.

Similarly by displacing the lens along the axis 88 astigmation at a 45° angle relative to the horizontal and to the vertical can be emulated. This is precisely analogous to counter-rotation of the lens elements C of FIGS. 1 and 2.

As in the case of the variable spherical lens element F, the variable astigmatic lens element G requires that only a small and discrete segment of its viewing surface be used for a view path. Otherwise, unintended distortion of substantial and variable astigmation will be resultant in the viewing area.

It should be understood that displacement of the view segment 84 along the axis 82 of the variable spherical lens element F is directly proportional to the spherical correction desired.

Likewise, displacement of the view segment 86 along either paths 87 or 88 or a component of such paths is directly proportional to the astigmatic input to be achieved. Such displacement along the axis 87 and 88 can be directly converted to a plot such as that illustrated in FIG. 4 along the X- and Y-axis respectively to set forth the resultant diopter power and angle of the astigmatic correction achieved.

In actual fact it has been found that relatively large lens elements are required when the embodiment of FIG. 5 is used. This is because smaller lens elements incorporate more variable surface area in the viewing segment to the point that substantial spherical or astigmatic unintended distortions occur. Accordingly, and as set forth in the L. W. Alvarez U.S. Pat. No. 3,305,294, the L. W. Alvarez and William E. Humphrey U.S. Pat. No. 3,507,565 and in my copending patent application for Variable Anamorphic Lens and Method of Constructing Lens, now U.S. Pat. No. 3,751,138, issued Aug. 7, 1973. I have found it desirable to confront the variable spherical lenses and the variable astigmatic lenses to generate a more compact optical instrument. Such an instrument is illustrated with respect to FIG. 7.

Referring to the exploded view of FIG. 7, an eye piece 90 has been mounted to an optic shield 92 with scale reading slots 93 and 94 cut into the sides and top of the shield as illustrated. Typically, a patient observes through eye piece 90 an eye chart R (see detail of FIG. 8).

Variable spherical optics H are shown mounted interior of the housing 95. Typically, two variable spherical lens elements are confronted and moved relative to one another as described in the L. W. Alvarez U.S. Pat. No. 3,305,204. One element is fixed to a rack 96, the remaining element is fixed to a rack 98. By the expedient of confronting the racks and turning a pinion 100, relative equal and opposite up and down movement between the two confronted variable power of spherical lens elements can occur.

As is set forth fully in the Alvarez U.S. Pat. No. 3,305,294 and the L. W. Alvarez and William E. Humphrey U.S. Pat. No. 3,507,565, variable spherical optics are generated along the optic path 102 of the instrument upon relative up and down movement between the rack mounted spherical power lens elements respectively. The power of spherical lens correction can be read at a scale such as that shown at the detail of FIG. 9 (the view of this scale being hidden in FIGS. 7 and 8).

Just as relative movement between the variable spherical power lens elements results in a variable spherical power, relative movement between confronted segments of a variable anamorphic lens produces variable anamorphic power. This can best be understood by referring to the anamorphic detail of the lenses of FIG. 6 and thereafter to the two lens elements 120 and 122 of the optometric instruments shown in FIG. 7.

Referring to FIG. 6, two variable astigmatic lenses 106 and 107 are shown confronted one to another. It will be sufficient for purposes of this disclosure to state that when a view is taken through these confronted lens elements and when one element is displaced relative to the other element with the relative rotational alignment of both lens elements 106, 107 maintained, a variable astigmatic effect is obtained. Moreover, this effect will be uniform over the overlapped portion of both lenses.

It is important to note that just as in the case of the single anamorphic lens element G, the two confronted anamorphic lenses 106 and 107, each produced cylinder effect identical to that cylinder effect described with respect to counter-rotating equal and opposite cylindrical lenses B and C of FIGS. 1 and 2.

In order to reduce the dimension of the lens element, lens element 120 comprises a horizontal strip taken from variable astigmatic lens element 106 of FIG. 6. Similarly, lens element 122 comprises a vertical strip taken from variable astigmatic lens element 107.

Returning to FIG. 7, lens element 122 is mounted to a vertical rack 125 actuated by a pinion 127. A scale 128 read at cursor 129 is capable of measuring the displacement of the rack 128 relative to the mount for the rack 130.

The mount of variable astigmatic lens element 120 is similar. Basically, a rack 135 is actuated by pinion 137. A scale 138 read at a cursor 139 on a body portion 140, typically rigidly attached to the body portion 130, indicates the amount of displacement of the variable astigmatic lens element 120.

Alternate reading of the relative displacement of the variable astigmatic lens elements is possible with the lens elements herein set forth. Cursor 145 attached to one moving lens element indicates on scale 150 attached to the other lens element, the relative displacement of the two optic elements. By the expedient of using a scale precisely identical to that scale shown and illustrated in FIG. 4, the astigmatic correction can either be read in Cartesian co-ordinates as taught by the improved process of this invention or alternately in the more standard diopter power and angular rotation co-ordinates used for astigmatic prescriptions.

Referring to FIG. 8, a side elevation detail of the assembled instrument is illustrated. Typically, a patient viewing at eye piece 90 looks along viewpath 102 to an eyechart R. By sequentially manipulating pinion 100, pinion 127 and thereafter pinion 137 eye correction can be obtained. As in the case of the previously illustrated optical instrument of FIG. 3, a sequential readjustment of the pinion 100, pinion 127 and pinion 137 may be desired as improved vision makes the eye of the patient P more sensitive to improved astigmatic vision.

It should be understood that the instrument illustrated with respect to FIGS. 1 through 3 and the instrument illustrated in FIGS. 7 and 8, each have their own peculiar advantages. In the case of the instrument illustrated in FIGS. 1 through 3, this instrument can easily be adopted to a binocular device wherein 12 pieces of glass are capable of emulating virtually any existing spherical and astigmatic prescription. Due to the fact that six pieces of relatively moving glass are required for each ocular train, the instrument produced according to the embodiment of FIG. 3 must have some length. The instrument shown in FIGS. 7 and 8 does not have a relatively long length. The instrument shown in FIGS. 7 and 8 does have a substantial width normal to view path 102. This instrument however, as shown here, does introduce an optical wedge into the viewer's vision dependent upon the relative displacement of elements 120 and 122. It is, therefore, not particularly desirable for incorporation into a binocular optometric device.

It should be realized that it is the purpose of this invention to disclose a process of applying correction to an existent prescription of a patient. This process is best illustrated in the embodiment of the invention illustrated in FIGS. 10, 11 and 12.

Referring to the embodiment of the invention illustrated in FIG. 7, and viewing with specificity FIG. 10, it will be seen that chart 150 of FIG. 10 is mounted for movement with respect to lens element 122. Specifically, the chart 150 can be translated upwardly and downwardly with respect to lens element 122 at slides 200 and held in a preselected upward and downward position by set screws 202.

Likewise, chart 150 can be moved towards and away from lens element 122. Specifically, chart 150 is movable along a horizontal slide 204 and held in a preselected disposition by set screws 206.

Understanding that chart 150 can be moved, the operative steps for prescribing a patient with a known prescription can now be explained. Specifically, the patient shown at P is placed with his eye glasses 210 between eye piece 90 and the view path 102 of the instrument. Typically, his glasses 210 have a cylindrical prescription of known power and known rotation between the eyes of the patient and the view path.

The eye chart of FIG. 10 is adjusted relative to the cursor 145 shown in FIG. 7. Specifically, the eye chart is registered at the known prescription of the patient. For example, in the view of FIG. 10, assume that a patient has an eye glass prescription of 2 diopters of cylinder at 50°. Scale 150 would be moved to register cursor 145 at 2 diopters of power at 50° of angle as shown on the chart of FIG. 10 (it being remembered that the angular scale has been expanded by a factor of 2).

Thereafter, the convergent and divergent cylindrical lens effect in both the X- and Y-axis of the chart shown on FIG. 10 would be prescribed for the patient. Where some change of prescription has occurred, a corresponding change in the cylindrical prescription will result.

For example, assume that a correction to the patient's cylindrical prescription is required. Specifically, the prescription must be corrected in an amount of half a diopter at 30°. Assuming this to be the case, manipulation of the apparatus of FIG. 7 will move the cursor 145 from its old position indicated at 220 to a new position 222. A new resultant spherical correction of 2.40 diopters at 46° will result.

It will be appreciated that a new cylindrical prescription results. This prescription should be a duplicate of any cylindrical prescription generated without the use of eye glasses. The method herein disclosed, however, has the advantage that the patient can wear eye glasses to which he is optically accustomed. Further, the patient will not be physiologically disturbed by the removal or absence of his eye glasses 210 and can therefore immediately be prescribed with some comfort.

Referring to FIG. 12, a chart is shown by which the process of the apparatus of FIGS. 10 and 11 can be practiced. Specifically, the chart of FIG. 12 is laid out on a polar coordinate basis. The horizontal axis, similar to the chart of FIG. 10, illustrates zero to 90° of cylinder. The vertical axis illustrates upwardly an increase of cylinder in the amount of 45°, and downwardly a decrease of cylinder in the amount of −45°. As is evident, the polar coordinates are drawn illustrating the increase and decrease of cylinder.

Assume that again, through corrective measurement with the patient's eye glasses on, and without the chart apparatus of FIG. 10, a correction of half a diopter at 15° is determined.

The first step in the use of a chart of FIG. 12 would be to plot the existent cylindrical prescription along the horizontal axis. In the case here shown, a power of 2 diopters would be plotted at 250.

Next, the corrective prescription would be plotted. Specifically, a vector of half a diopter at an angle of 15° would be plotted (it being remembered that the angle is again expanded by a factor of 2).

The resultant polar coordinate vector would be a 2.40 diopter prescription at an angle of −4°.

By the simple process of addition, the same result as obtained in the apparatus of FIG. 10 would occur. Specifically, the power of the new corrected cylindrical prescription would be 2.20 diopters. The angle of the new prescription would be −4° less than the original angle of cylinder. In the case here shown, it would be 46°.

In this application, I have set forth three preferred embodiments of my invention. It will be understood that other embodiments of this invention can be made without departing from the spirit and scope thereof. For example virtually any device for varying the cylinder power of lenses relative to a line substantially normal to a viewpath can be substituted for each of the counter-rotating cylinder lenses B and C of FIGS. 1 and 2. Moreover, although it is preferred that the variable cylinder power produces equal and opposite cylindrical lens effect along orthogonal axes, this is not required. Likewise various combinations of variable spherical optics may be used. Additionally, various eye charts and configurations of eye charts known in the art can either be used by attachment to the optometric instrument or alternately by conventional mounting to the wall at some distance to the optical instrument. Likewise other modifications can be made without departing from the spirit and scope of this invention.

I claim:

1. A process for describing astigmatic effects of a cylinder lens in power and variable rotational alignment relative to a preselected view path on a patient having vision correction of a cylindrical prescription of known power and known angular rotation, said process comprising the steps of: providing a patient viewing station; providing an image to be viewed along a light path to said image; placing said cylinder prescription of known power and known rotation between eyes of said patient and said view path; determining cylindrical lens power and angle of said patient as viewing said target through said prescription; providing a coordinate plot having first and second axes; plotting on said coordinate the vector of the power and doubled angle of cylinder of said known cylindrical prescription; plotting from said vector the determined cylinder power and doubled angle of said patient through said known prescription; locating on said coordinate plot a coordinate point relative to said first and second axes to determine the power and doubled angle of said corrected prescription.

* * * * *